UNITED STATES PATENT OFFICE.

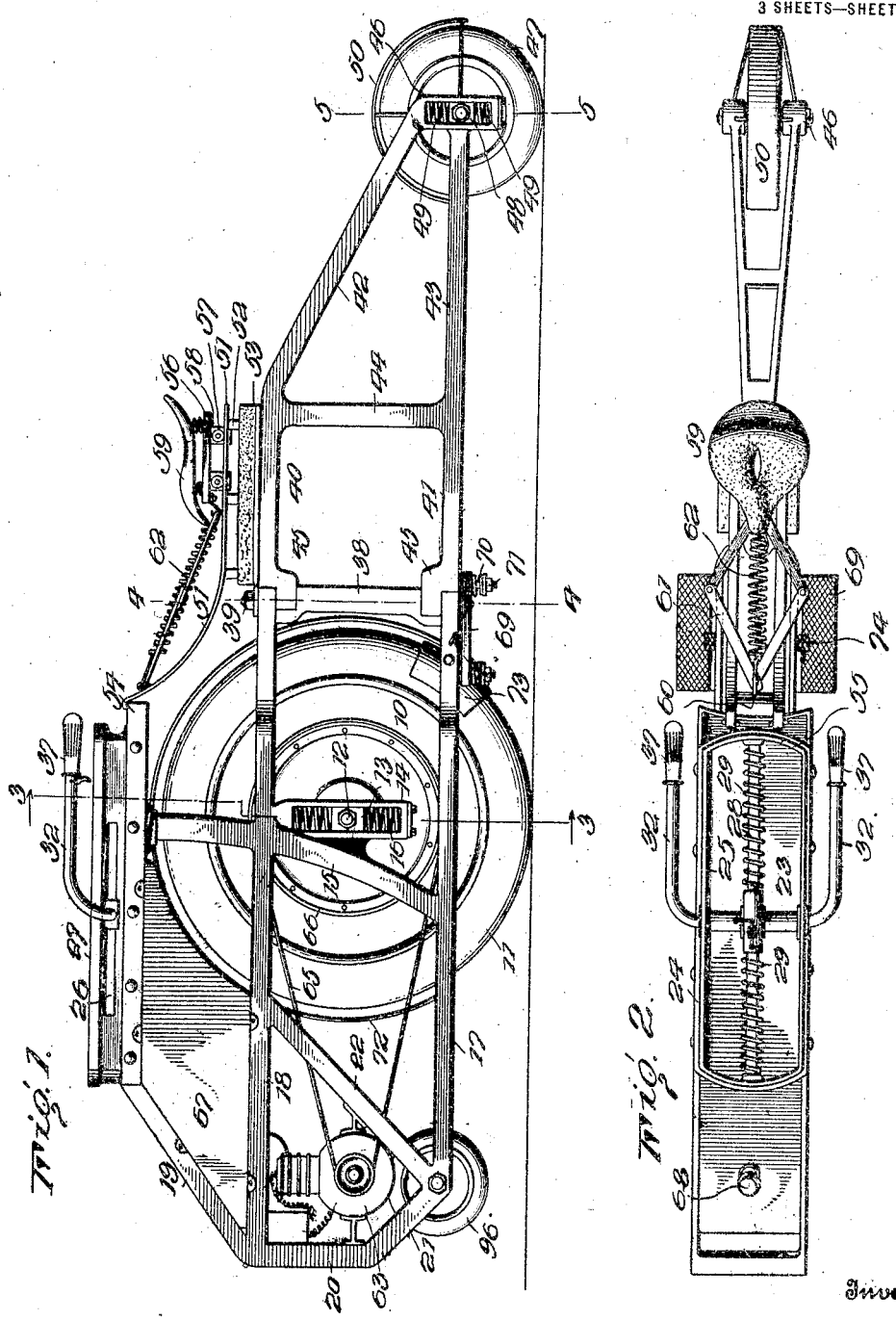

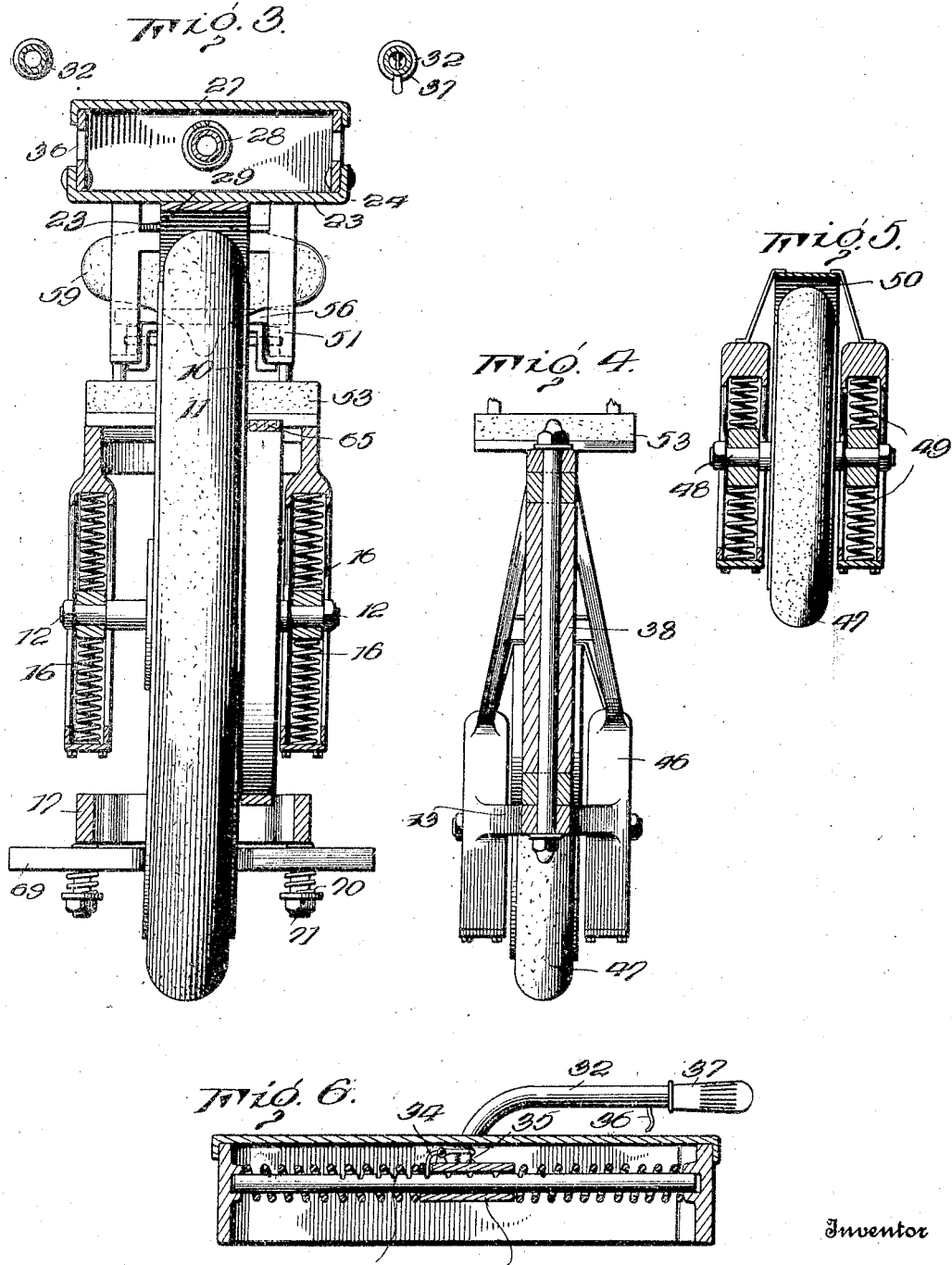

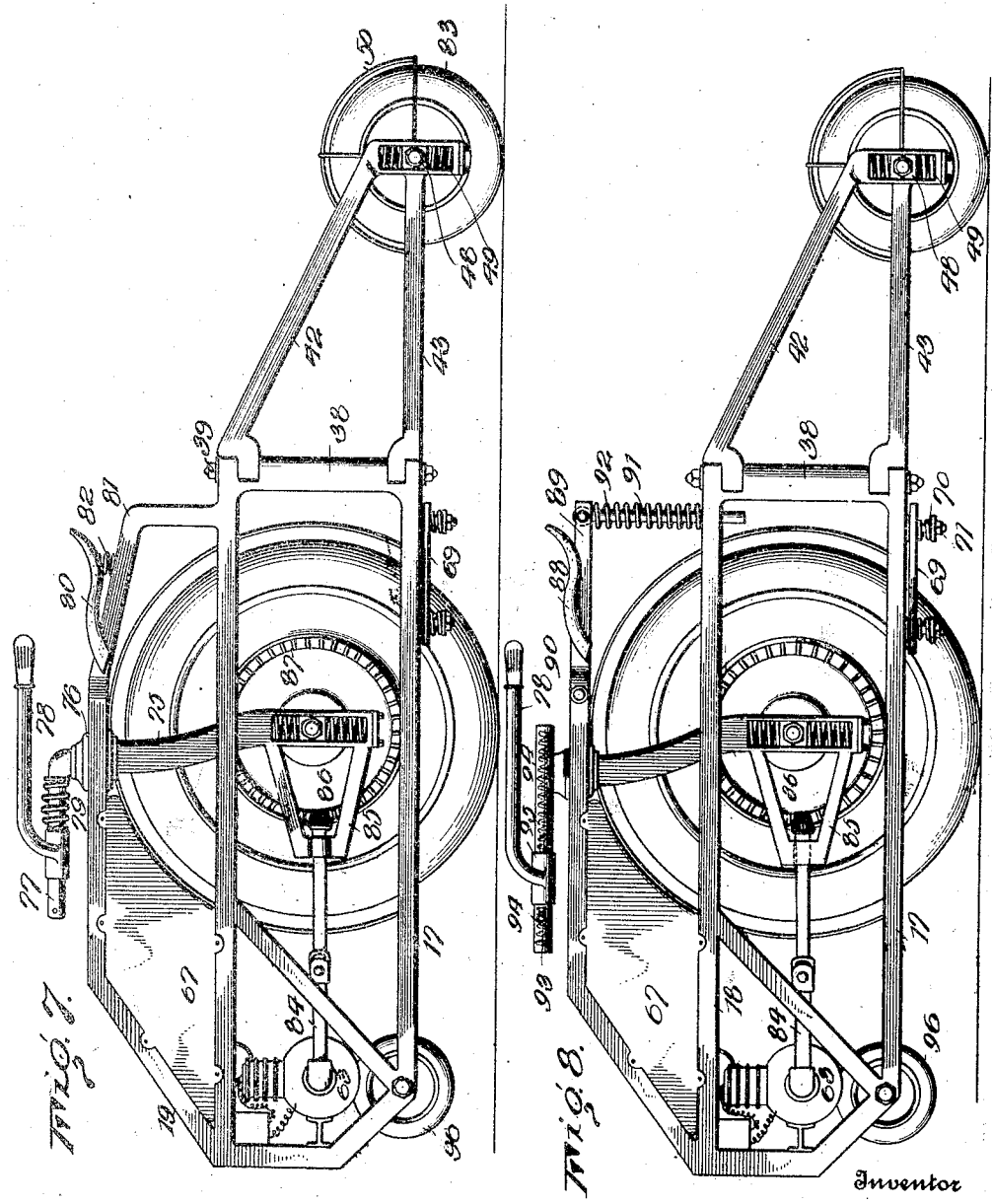

JOHANNES MESECKE, OF HAVELBERG, GERMANY.

BALANCED MOTOR-WHEEL.

1,197,526.     Specification of Letters Patent.     Patented Sept. 5, 1916.

Application filed January 24, 1916. Serial No. 73,973.

*To all whom it may concern:*

Be it known that I, JOHANNES MESECKE, subject of the German Emperor, residing at Havelberg, Germany, have invented certain new and useful Improvements in Balanced Motor-Wheels, of which the following is a specification, reference being had therein to the accompanying drawing.

The invention relates to improvements in motor cycles, and has for its object to provide a structure of a type which embodies the use of a single tractor wheel upon which is supported practically the entire weight of frame, and the appurtenances carried thereby, and in part, or wholly, the weight of the operator, as may be desired for the proper operation of the vehicle.

With this and other objects in view, the invention resides in the certain construction to be hereinafter more fully described, set forth in the appended claims, and illustrated in the accompanying drawing, in which, Figure 1 is a side elevation of the preferred form of the invention, Fig. 2 is a top plan view of the same with the casing cover removed, Fig. 3 is a vertical transverse section on the line 3—3 of Fig. 1, Fig. 4 is a vertical transverse section on the line 4—4 of Fig. 1, Fig. 5 is a vertical transverse section on the line 5—5 of Fig. 1, Fig. 6 is a longitudinal sectional detail of the handlebars and their supporting yoke, Fig. 7 is a side elevation of a modified form of the invention, and, Fig. 8 is a side elevation of a second modification of the same.

Referring to the drawing, in which similar characters of reference designate corresponding parts of the several views thereof, the numeral 10 represents a tractor wheel provided, preferably, with a pneumatic or cushion tire 11, and having its axle 12 supported in bearings 13, which are slidably retained in guide yokes 14, which are formed with, or secured to, forked members 15, forming a part of the main frame of the vehicle. The bearings 13 are resiliently held between balanced springs 16, each of the latter being disposed, one below and one above the bearings 13, within the guide yokes 14.

Inclosing the tractor wheel 10, is an elongated main frame comprising spaced lower horizontal bars 17, and corresponding upper bars 18, arranged in pairs, each disposed at opposite sides of the tractor wheel, and having their rear ends bent inwardly, in opposite directions, to provide a narrower frame portion extending to the rear of the tractor wheel. The forward ends of the lower bars 17 are of a length relatively shorter than those of the upper bars 18, to admit of the use of an angular connecting frame 20, the lower end portion 21, of which, being inclined upwardly and forwardly from its point of connection with the lower bars. An upwardly and rearwardly inclined brace member 22 connects the forward ends of the lower bars 17 with an intermediate portion of the upper bars 18. The forked members 15 connect with the upper bars 18, at a point slightly in advance of the vertical transverse center of the tractor wheel 10, so that the guide yokes 14 are supported directly in line with the axis of the wheel, and curve forwardly and downwardly and connect with the lower bars 17.

The angular connecting frame 20, from its point of connection with the ends of the upper bars 18, is bent rearwardly and upwardly as at 19, and connects to, and supports, a plate member 23, which, in turn, extends rearwardly, in a horizontal plane, above the main frame, so that it overlies the major portion of the tractor wheel 10, and is supported, adjacent its rear end, upon the connected portion of the forked members 15.

The plate member 23 is flanged, as at 24, to receive and retain an annual yoke 25, which is formed with oppositely disposed slots 26, and which is adapted to be inclosed with a cover plate 27. Extending longitudinally of the yoke 25, is a guide rod 28, upon which is arranged oppositely disposed coiled springs 29, between which is slidably supported a guide sleeve 30, formed with a connecting sleeve 31, of a pair of handle bars 32, which project, in opposite directions, through the slots 26, and curve rearward therefrom for any desired distance. The top face of the guide rod 28 is formed with a plurality of alined recesses 33, adapted to be engaged by a pawl 34, pivotally supported on the sleeve 30, in a manner to secure the handle bars in any desired adjusted position against the tension of either of the springs 29, which normally tend to retain the sleeve 30 at a point centrally of the guide rod or bar. Connected to the pawl 34, is a flexible member or wire 35, which is threaded through one of the handle bars 32 and connected to the inner end of a finger grip or trigger 36 pivoted immediately adjacent one of the usual handgrips 37, of the handle bars.

The narrower portions of the main frame, to the rear of the tractor wheel 10, are connected, in spaced relation, by means of a sleeve 38, which forms a bearing for the reception of a shaft or bolt element 39, which pivotally connects an auxiliary or trailer frame to the rear of the main frame. This auxiliary or trailer frame is provided to lend stability to the motor cycle, and comprises upper and lower horizontal bars 40 and 41, each formed with forked members 42 and 43, respectively, and a vertically disposed spacing bar 44. The free ends of the bars 40 and 41 are formed with inset bearing lugs 45, which are adapted to be engaged by the shaft 39, at the rear of the main frame. The upper forked member 42 is inclined downwardly and connects with a bearing yoke 46 carried by the horizontally disposed forked member 43. A trailer wheel 47 is positioned within the forked members and has its axle supported in slide bearings 48, which are carried in the oppositely disposed bearing yokes 46, and supported between balanced coiled springs 49 therein. A mud-guard 50, of usual construction, may be arranged to overlie the upper periphery of the trailer wheel, as shown.

Supported on the horizontal member 40, of the trailer frame, is a trackway 51, secured in spaced relation to the former by means of bolts, not shown, having spacing sleeves 52 resting on a resilient element or pad 53, which acts to absorb any and all shocks which would otherwise be transmitted to the trackway. This trackway extends the length of the member 40, and curves upwardly from the forward end of the same, and engages a guide channel 54, formed with the plate 23. Suitable rollers 55 being provided at the extremities of the track elements to admit of free movement of the latter within the guide channel. Supported upon the track elements 51, is a plate 56, carried on rollers 57, which are supported by angle members or brackets 58, depending from the plate 56, and which project below and engage slightly under the lower faces of the track elements. A seat 59 is adjustably supported on the plate 56, and resiliently with respect thereto, as in the usual manner of known types of such vehicle seats. Connecting the forward end of the plate 56, with the connecting bar 60, at the forward end of the trackway, is a toggle 61, which is preferably provided with a coiled spring 62, to normally draw the plate, and the seat carried thereby, to the limit of its forward movement.

Mounted within the V-shaped portion of the main frame, at the forward end thereof, is any desired form of power source, such as the internal combustion engine CB, as shown, the same being provided with a pulley 64, for the transmission of power therefrom, through the medium of a belt 65, to a pulley 66, carried by the tractor wheel 10. A fuel tank 67, preferably shaped to be fitted within the frame immediately above the engine, having a filling vent 68, in its forward inclined face, is provided and suitably connected to the engine. Usual controlling means, not shown, are contemplated for the varying of the fuel supply to the engine for the regulation of the speed of the latter.

In the operation of the motor cycle, the operator takes his place on the seat 59, and draws the same rearwardly, against the tension of the spring 62, to the limit of the open movement of the toggle 61, so that his weight is supported immediately on the forward part of the trailer frame to the rear of the shaft 39, and which is, therefore, distributed, to a marked degree, onto the trailer wheel 47, and which admits of the engine starting light, or with only the weight of the forward part of the cycle being supported directly on the tractor wheel 10. Having started the engine, with any increase in speed, the rider gradually slides the seat forward on the trackway 51, for the purpose of adding his weight progressively, with such increase in speed, to the main frame, and consequently to the tractor wheel, whereby to increase the tractive power of the latter, and continues to do so, until the seat 59 occupies its normal position, at which point the entire weight of the rider is borne, or nearly so, by the tractor wheel, thus permitting the trailer wheel 47 to run practically free, and utilizing the full power of the engine directly on the single tractor wheel.

To enable the rider to maintain equilibrium and balance to the motor cycle, when the trailer wheel is running free and his weight is impressed entirely on the single tractor wheel, it is to be desired that the handle bars 32 be adjusted simultaneously with the forward and backward movement of the seat, and during such movement of the seat, the operator actuates a finger grip or trigger 36 to release a pawl 34, from its engagement with one of the recesses 33, of the guide rod 28, and forces the handle bars 32 to a desired position, and, by releasing the trigger 36, the pawl 34 engages with a corresponding recess to secure the handle bars in such adjusted position. To further aid in obtaining or maintaining the desired balance, there is provided, at opposite sides of the main frame, suitable foot-rests 69, which are, preferably, supported on the coiled springs 70, carried by the guidebolts 71, as shown.

A mud-guard 72 is provided to surround the major portion of the tractor wheel 10; and a brake shoe 73 is suitably positioned to the rear of the tractor wheel, and operated by means of a foot-lever 74 disposed to either or both sides of the main frame, immediately adjacent the foot-rests 69, as shown.

In Fig. 7, of the drawing, there is shown a modified form of the invention, in which the forked member 75 is pivoted, as at 76, within the main frame, and is provided with a horizontally disposed guide rod 77, upon which is supported the handle bars 78, which are normally held at the forward end of the guide rod by the action of a coiled spring 79, and which are adapted to be moved to any desired position on the rod to aid the rider in obtaining a balanced position and control of the motor cycle. In this type of construction, the seat 80, resiliently supported on the supporting bar 81, of the main frame, by means of a spring 82, is stationary with respect to the main and trailer frames, and is located immediately to the rear of the vertical transverse center of the tractor wheel, so that nearly the entire weight of the rider is impressed upon the tractor wheel, thus allowing the trailer wheel 83 to run practically free. To admit of the turning of the forked member 75, and the tractor wheel controlled thereby, within the main frame, a flexible shaft 84 is connected, at one end, to the shaft of the engine 63, and has its forward end supported in a bearing 85, carried by the forked member 75, and provided with a beveled gear 86 in mesh with a beveled gear 87, carried by the tractor wheel. The remaining structure of this modification is identical with that of the preferred form of the invention, as hereinbefore described.

In Fig. 8, showing a second modified form of the invention, a seat 88 is fixedly secured to a pivoted bar 89, one end of which being pivoted to the main frame, as at 90, and the other of its ends pivotally connecting with a guide rod 91, which is slidably engaged in the upper bar 18, of the main frame, and resiliently movable with respect to the frame by reason of a coiled spring 92 being interposed between the bar 18 and the bar 89. In this construction, the upper end of the forked member 75 is provided with a tubular guide member 93, which slidably supports the handle bars 78, and incloses a pair of oppositely disposed coiled springs 94, between which is engaged an abutment, not shown, formed with the sleeve 95, of the handle bars. In this case, as in the first instance, the action of the springs 94 is to retain the handle bars centrally of the guide member, and to readily facilitate the adjustment of the handle bars.

At the lower end portion of the forward part of the main frame, there is provided a roller 96, preferably, of hard rubber, or the like, which acts as safety device to ward off obstructions, or to prevent the rider from being thrown in case of a loss of balance to the motor cycle, and which is also adapted for use as a support to maintain the cycle in standing position, when the latter is not in use.

It will be understood that various changes in design or detail of construction may be resorted to without departing from the spirit and scope of the invention.

Having thus fully described the invention, what is claimed is:—

1. In a motor cycle, a single tractor wheel, a main frame, a power plant carried on said main frame, an adjustable steering means, means for retaining said steering means in any of its adjusted positions, and means for adjusting the weight of the operator on the main frame, whereby to balance the latter on the tractor wheel and to maintain equilibrium thereto.

2. In a motor cycle, a single tractor wheel, a main frame, a power plant carried on said main frame, an adjustable steering means, means for retaining said steering means in any of its adjusted positions, means for adjusting the weight of the operator on the main frame, whereby to balance the latter on the tractor wheel and to maintain equilibrium thereto, and a stabilizing device.

3. In a motor cycle, a single tractor wheel, a main frame resiliently supported on said tractor wheel, a power plant carried on said main frame, an adjustable steering means, means for retaining said steering means in any of its adjusted positions, means for adjusting the weight of the operator on the main frame, whereby to balance the latter on the tractor wheel and to maintain equilibrium thereto, and a stabilizing device.

4. In a motor cycle, a single tractor wheel, a main frame resiliently supported on said tractor wheel, a power plant carried on said main frame, an adjustable steering means, means for retaining said steering means in any of its adjusted positions, a seat on the main frame, and a stabilizing device.

5. In a motor cycle, a single tractor wheel, a main frame resiliently supported on said tractor wheel, a power plant carried on said main frame, an adjustable steering means, means for retaining said steering means in any of its adjusted positions, a seat movable on the main frame, and a stabilizing device.

6. In a motor cycle, a single tractor wheel, a main frame resiliently supported on said tractor wheel, a power plant carried on said main frame, an adjustable steering means, means for retaining said steering means in any of its adjusted positions, a seat movable on the main frame, means normally retaining said seat forwardly of the frame, and a stabilizing device.

7. In a motor cycle, a single tractor wheel, a main frame resiliently supported on said tractor wheel, a power plant carried on said main frame, an adjustable steering means, means for retaining said steering means in any of its adjusted positions, a seat movable longitudinally of said main frame, means normally retaining said seat forwardly of the frame, and a trailer frame disposed rearwardly of said main frame.

In testimony whereof I affix my signature in the presence of two witnesses

JOHANNES MESECKE

Witnesses:
 ROLAND C. BOOTH,
 SAMUEL R. KYLE.